Patented Sept. 28, 1948

2,450,377

UNITED STATES PATENT OFFICE 2,450,377

STARCH-RESIN REACTION PRODUCT AND METHOD OF PRODUCING THE SAME

Carl C. Kesler, William C. Black, William L. Hicks, and Carlton N. Owen, Cedar Rapids, Iowa, assignors to Penick & Ford, Ltd., Incorporated, Cedar Rapids, Iowa, a corporation of Delaware No Drawing. Application July 31, 1944,
Serial No. 547,510

11 Claims. (Cl. 260—17.3)

This invention relates to a starch-resin reaction product and a method of producing the same, and more particularly to the production of a starch-resin reaction product which possesses numerous advantageous properties as in adhesive or sizing and is capable of forming a water-resistant bond and film.

An object of the invention is to provide a starch-resin reaction product which may be used at elevated temperatures and provides improved adhesion and ease of use and handling in production. Another object is to provide a starch-resin adhesive possessing a longer life than the starch-resin adhesives heretofore known. A further object is to obtain a starch-resin adhesive by means of which a uniformity of production may be obtained so as to insure quality and consistent performance. Still another object is to provide a quick setting adhesive which contains water resistance in less time than has been possible with adhesives previously used. Yet another object is to impart improved cohesion to standard starch bonding materials.

Another object of the invention is to produce an improved starch-resin adhesive from relatively inexpensive and readily available raw materials. A further object is to produce a starch-resin adhesive having increased flexibility in the dried film existing in the finished bonded product.

Another object of the invention is to provide a coating composition possessing improved water resistance and cohesiveness. A further object is to provide a starch coating composition in which retrogradation is substantially eliminated.

In the prior art, efforts have been made to incorporate various resins in starch adhesives in order to improve the water-resistant properties of the adhesive. In these adhesives, a potentially reactive composition is applied to the board components, in a form having characteristics which enable it to be pumped, spread or otherwise handled. After the adhesive is applied to the board, a reaction proceeds which insolubilizes the adhesive. The usual practice is to cook a starch adhesive that is approximately neutral to above 185° F., then cool to about 120° F., and add to the adhesive a water-soluble urea formaldehyde resin. To the mixture is then added ammonium salt which catalyzes the setting of the resin. The production of such products, however, has been found to involve many difficulties. Should the above insolubilizing chemical reaction take place in the adhesive prior to its application on the board, it would not be in a condition to be spread, pumped or handled with conventional equipment. The glue life of the product is very short and may be in the order of a few hours. Beyond this time the glue may set to a rigid unusable gel. If the pH of the mixture is unduly lowered, the glue will also become too heavy and impossible to use. Similarly, if the mixture is heated, the same result follows. The gelling or thickening of the glue is extremely undesirable since it not only interferes with proper application of the product, but when used in apparatus containing pipe lines, the lines may be plugged.

Even when the adhesive is so carefully handled and controlled as to be applied before the formation of a gel, the product bonded with the adhesive must be aged for several days in order to obtain the desired water-resistant bond.

The product of this invention differs from the prior art in that a starch-resin reaction product is formed prior to the application of the adhesive to the components of the board to be bonded. However, due to the procedures involved in the preparation of the adhesive, the objectionable gel formed by a reacted starch-resin complex is destroyed, thus producing in itself a reacted adhesive which becomes water resistant upon drying only and does not depend upon a subsequent chemical reaction of the adhesive in the bonded board.

The present invention contemplates a starch-resin adhesive having a much longer glue life. In addition, the product of the present invention does not thicken or gel upon lowering of the pH or elevation of the temperature. For example, the product of the present invention may be at a pH in the neighborhood of 4 and at a temperature in the neighborhood of 160° F.–170° F. when applied to the material to be bonded. In the production of solid fiber board, such an adhesive, by reason of the relatively low pH and relatively high temperature which may be used, will very quickly form a water-resistant bond in the glue line.

Starch in any suitable form may be used in the preparation of the product of the invention. The term "starch" as used herein is intended to include such forms of starch as corn, tapioca, potato starch, etc., and the various flours which contain starch as the principal ingredient.

Modified starches may be used, with the modification carried out to any desired extent. For example, thin boiling starch and oxidized starch may be used. A low-soluble dextrin may also be used in the preparation of the product of the invention.

The resins to which the invention is applicable include all potential urea-formaldehyde condensation products as well as the condensation products of varying degrees of polymerization. It is preferred to use methylol urea, dimethylol urea or water-soluble urea formaldehyde because they are inexpensive and readily available commercially.

The process of the invention involves broadly the heating of the starch with the resin in the presence of a suitable catalyst. It is important that both the resin and the catalyst be added to the starch before or during the cooking of the starch.

The catalyst may be an acidic inorganic salt. By an acidic salt is meant a salt which in water gives an acid reaction, for example, a salt of a strong acid and a weak base such as aluminum sulfate or papermakers' alum. Ammonium salts are effective in that they combine chemically with the ingredients of the resin liberating free acid. The resin thus removed is, of course, useless for the purpose of combining with the starch and for this reason ammonium salts are not the preferred catalysts. Moreover, the alum appears to produce improved results which cannot be attributed solely to its acidity. Any suitable quantity or proportion of the catalyst may be used. For example, between 0.5% and 10% by weight of a catalyst such as alum on the basis of the quantity of starch used has been found to be suitable, with approximately 3% being preferred.

The product may be formed by dispersing the starch in a suitable quantity of water, with the starch being in a concentration of, for example, 35% in the water. To this mixture may be added the desired quantity of resin. Between 5% and 20% by weight of the resin on the basis of the starch present in the finished adhesive has been found to be a suitable quantity of the resin. The acidic inorganic salt, such as the alum, is then added to the mixture. The mixture is cooked in a cooking operation that corresponds to the conventional cooking used in the gelatinizing of starch. For example, the temperature of the mixture may be raised to in the neighborhood of 170° F. to 210° F. and maintained at such temperature for a period in the neighborhood of one-half hour.

In the initial stages of the starch gelatinization the paste soon attains a peak viscosity somewhat higher than that of a similar paste containing no resin. As the cooking proceeds under the influence of the acidic catalyst the viscosity drops rapidly until it reaches a minimum level somewhat less than that ordinarily reached by a non-resin-containing starch paste. In the techniques practiced up to the present time no provision is made for reducing this peak viscosity and it is the factor responsible for the difficulties enumerated above.

The product is then ready for use as an adhesive and may be applied at any desired temperature.

For the purpose of illustrating the invention, the following specific examples are set forth:

I

| | Pounds |
|---|---|
| Thin boiling starch | 4400 |
| Dimethylol urea | 360 |
| Alum | 140 |

The mixture is suspended in a 2,000 gallon tank with sufficient water to provide a 35% solids concentration, and is cooked at 190° F. for a period of approximately 30 minutes. The mixture is then ready for use after being cooled to any desired temperature. Operation at approximately 160° F. is often found to be desirable. The pH of a mixture so prepared will be found to be approximately 4 or slightly lower, and no further checking of the acidity will be found necessary.

II

| | Pounds |
|---|---|
| Thin boiling corn starch | 4400 |
| Dimethylol urea | 360 |
| Alum | 140 |
| Clay | 320 | or

III

| | Pounds |
|---|---|
| Thin boiling corn starch | 4400 |
| Dimethylol urea | 450 |
| Alum | 150 |
| Clay | 1000 |

The above mixtures are particularly suitable for bonding products where excessive penetration of glue in the fiber board or other material might be expected. These mixtures may be suspended in 2,000 gallon tanks with sufficient water to provide a 35% solids concentration and cooked at 190° F. for a period of approximately 30 minutes.

The starch-resin reaction products obtained in accordance with the present invention have a relatively long glue life and have no substantial tendency to thicken into an unusable gel. The pH of the product may be in the neighborhood of 4 so as to obtain rapid setting of the resin and formation of the water-resistant bond when the product is applied and yet there is no interference with the use of the product by reason of gelling. Similarly, in applying the product, a relatively high temperature, such as 160° F.-170° F. can be used in order to obtain rapid bonding.

The product of the invention is extremely valuable in coating compositions. Heretofore starch alone has been used quite extensively as a binder for pigments and the like because of its availability and ease of preparation as compared with various protein bonding agents, such as casein and vegetable materials. However, such starch coatings are not water-resistant, and a greater quantity of starch than casein is needed to bond pigments to the coated stock. Moreover, the cohesiveness of the starch is somewhat limited and the bonding film may be changed by reason of a shrinking and separation due to retrogradation of the starch. Because of these difficulties, starch has heretofore been somewhat limited in use in the coating field.

When the product of the present invention is used in a coating composition, retrogradation is substantially eliminated, the desired cohesiveness is obtained, and the product, if desired, may be easily rendered water-resistant.

The starch-resin reaction product may be used in a coating composition by mixing it with a suitable quantity of a filler and a dispersing agent in an aqueous medium. Any suitable or conventional filler used in coating compositions, such for example as clay, may be used. Similarly, any suitable dispersing agent conventionally used for dispersing the clay in coating compositions may be used. The starch-resin reaction product may be made in accordance with the process already described. The type of starch which is used in the product will depend to some extent upon the type of coating desired. For example a roll coating requires a starch of higher viscosity than does a brush coating. Consequently, a less modified starch or one of higher solids content is used for the roll coating. Specific examples of starch-resin reaction products which may be used in the coating composition are as follows:

Reaction product I

| | Parts |
|---|---|
| Oxidized starch (sold under the trade name of "Clearsol Gum") | 87 |
| Dimethylol urea | 8 |
| Alum | 3 |

Reaction product II

| | Parts |
|---|---|
| 90 Fluidity starch (acid-modified thin boiling starch having a fluidity of 90 according to the alkali fluidity test) | 90 |
| Dimethylol urea | 6 |
| Alum | 3 |

Reaction product III

| | Parts |
|---|---|
| Low-soluble dextrin (British gum type dextrin having a soluble content of 10%, such as the products sold under the trade name "Douglas 514") | 79 |
| Dimethylol urea | 18 |
| Alum | 3 |

Each of the above products is cooked in accordance with the procedure previously described.

The starch-resin reaction product is then mixed with clay, water, and a dispersing agent. Usually it is desirable to adjust the pH of the starch-resin reaction product to a point suitable for satisfactory dispersion of the clay. This point is often near the neutral point or, with certain types of clay, slightly on the alkaline side. The clay dispersion and the starch-resin reaction product may be separately dispersed in water, and the two dispersions mixed to produce the final coating composition.

For the purpose of illustration, the following are certain specific examples of coating compositions:

Roll coating

| | | |
|---|---|---|
| Clay | pounds | 1000 |
| Water | gallons | 80 |
| Dispersing agent | pounds | 3 |
| Reaction product as above | pounds | 200 |
| Containing water | gallons | 56 |

Brush coating

| | | |
|---|---|---|
| Clay | pounds | 1000 |
| Water | gallons | 225 |
| Dispersing agent | pounds | 3 |
| Reaction product as above | pounds | 200 |
| Containing water | gallons | 72 |

Air brush coating

| | | |
|---|---|---|
| Clay | pounds | 1000 |
| Water | gallons | 52 |
| Dispersing agent | pounds | 3 |
| Reaction product as above | pounds | 150 |
| Containing water | gallons | 72 |

Coating compositions made in accordance with the present invention possess an improved wax test, have good printability, and possess, if desired, a marked water resistance. This latter property is obtained by coating at a suitable pH determined by the dispersion characteristics of the clay and the water-resistance desired in the final coating.

Although the invention has been described in connection with certain specific examples and embodiments, it will be apparent that modifications and changes may be made without departing from the spirit and scope of the invention.

We claim:

1. A method of preparing a reaction product forming a film of increased water resistance, comprising cooking with sufficient water to give the final product a fluidity suitable for application at a temperature of 170–210° F. material selected from the group consisting of starch and low-soluble dextrin, with between 5% and 20% on a starch-weight basis of a water-soluble urea-formaldehyde reaction product, and sufficient acidic material to lower the pH to substantially 4.0, and continuing the heating until the material passes through a range of increased viscosity where it is unsuitable for application and then decreases into a range where it is again suitable for application.

2. A method of preparing a starch reaction product comprising cooking with sufficient water to give the final product a fluidity suitable for application at a temperature of 170–210° F. starch, with between 5% and 20% on a starch-weight basis of a water-soluble urea-formaldehyde reaction product, and sufficient acidic material to lower the pH to substantially 4.0 and until the viscosity of the mixture has passed through a range of increased viscosity where it is unsuitable for application, and then back into a range where it is suitable for application.

3. A method of preparing a starch reaction product comprising cooking with sufficient water to provide a solids concentration of about 35%, at a temperature of 170–210° F. starch, with between 5% and 20% on a starch-weight basis of a water-soluble urea-formaldehyde reaction product, and sufficient acidic material to lower the pH to substantially 4.0 for a period of about 30 minutes.

4. A method of preparing a reaction product forming a film of increased water resistance, comprising cooking with sufficient water to give the final product fluidity suitable for application, and at a temperature of 170–210° F., material selected from the group consisting of starch and low-soluble dextrin, with between 5% and 20% on a starch-weight basis of dimethylol urea, and sufficient acidic material to lower the pH to substantially 4.0, and continuing the heating until the material passes through a range of increased viscosity where it is unsuitable for application and then decreases into a range where it is again suitable for application.

5. The method of claim 4 in which the acidic material is aluminum sulphate.

6. The method of claim 5, in which the percentage of the aluminum sulphate is 0.5% to 5.0% on a starch-weight basis.

7. A method of preparing a reaction product forming a film of increased water resistance, comprising cooking with sufficient water to give the final product a fluidity suitable for application, and at a temperature of about 170–210° F., a low-soluble dextrin, with between 5% and 20% on a dextrin-weight basis of a water-soluble urea-formaldehyde reaction product and sufficient acidic material to lower the pH to substantially 4.0, and continuing the heating until the material passes through a range of increased viscosity where it is unsuitable for application and then decreases into a range where it is again suitable for application.

8. A method of preparing a reaction product forming a film of increased water resistance, comprising cooking with sufficient water to give the final product a fluidity suitable for application, and at a temperature of about 170–210° F., a thin boiling starch, with between 5% and 20% on a starch-weight basis of a water-soluble urea-formaldehyde reaction product and sufficient acidic material to lower the pH to substantially 4.0, and continuing the heating until the material passes through a range of increased viscosity where it is unsuitable for application and then decreases into a range where it is again suitable for application.

9. A product obtained by the method of claim 1.

10. A product obtained by the method of claim 4.

11. A product obtained by the method of claim 5.

CARL C. KESLER.
WILLIAM C. BLACK.
WILLIAM L. HICKS.
CARLTON N. OWEN.

REFERENCES CITED

The following references are of record in the file of this patent:

UNITED STATES PATENTS

| Number | Name | Date |
|---|---|---|
| 2,191,362 | Widmer | Feb. 20, 1940 |
| 2,212,314 | Bauer | Aug. 20, 1940 |
| 2,302,309 | Glarum | Nov. 17, 1942 |
| 2,302,310 | Glarum | Nov. 17, 1942 |
| 2,321,544 | Dittmar | June 8, 1943 |
| 2,322,887 | Schwartz | June 29, 1943 |
| 2,338,602 | Schur | Jan. 4, 1944 |
| 2,400,820 | Glarum | May 21, 1946 |

FOREIGN PATENTS

| Number | Country | Date |
|---|---|---|
| 502,724 | Great Britain | Mar. 21, 1939 |

OTHER REFERENCES

Kerr: Chemistry and Industry of Starch; pages 44–61 (page 44 specifically cited); Academic Press, New York (1944).